United States Patent [19]

Doi et al.

[11] 4,306,305

[45] Dec. 15, 1981

[54] PCM SIGNAL TRANSMITTING SYSTEM WITH ERROR DETECTING AND CORRECTING CAPABILITY

[75] Inventors: Toshitada Doi, Yokohama; Kentaro Odaka, Tokyo, both of Japan

[73] Assignee: Sony Corporation, Tokyo, Japan

[21] Appl. No.: 86,677

[22] Filed: Oct. 19, 1979

[30] Foreign Application Priority Data

Oct. 23, 1978 [JP] Japan .................... 53-130161

[51] Int. Cl.³ .................... G06F 11/10
[52] U.S. Cl. .................... 371/38; 371/40
[58] Field of Search .................... 371/38, 39, 40, 37

[56] References Cited

U.S. PATENT DOCUMENTS

| | | | |
|---|---|---|---|
| 3,278,729 | 10/1966 | Chien | 371/40 |
| 3,506,961 | 4/1970 | Abramson et al. | 371/40 |
| 3,582,881 | 6/1971 | Burton | 371/40 |
| 3,988,677 | 10/1976 | Fletcher et al. | 371/40 |
| 4,206,440 | 6/1980 | Doi et al. | 371/39 |
| 4,211,997 | 7/1980 | Rudnick et al. | 371/38 |

FOREIGN PATENT DOCUMENTS 2012460  7/1979  United Kingdom .................. 371/40

*Primary Examiner*—Charles E. Atkinson
*Attorney, Agent, or Firm*—Lewis H. Eslinger; Alvin Sinderbrand

[57] ABSTRACT

A PCM (pulse code modulation) signal transmission system processes sequentially transferred digital information words including two error correcting words consisting of a parity code word and a b-adjacent code word and adds them to the digital information words, time-interleaves each of the information words and its error correcting words in the block into time-interleave blocks distributed over a predetermined time, adds an error detecting code to at least one of the time-interleaved blocks, and transmits at least one time-interleaved block and error correcting code associated therewith. Method and apparatus for de-interleaving and error correction based on the three appended codes are included.

6 Claims, 10 Drawing Figures

PCM SIGNAL TRANSMITTING SYSTEM WITH ERROR DETECTING AND CORRECTING CAPABILITY

BACKGROUND OF THE INVENTION

1. Field of the Invention

The present invention relates generally to a PCM signal transmission system, and is directed more particularly to a method and apparatus for processing sequentially transferred digital information words.

2. Description of the Prior Art

British Pat. No. 1,481,849 discloses a system in which an error detecting signal is added to each signal. A plurality of such signals, including the added error detecting signals, form a block. An error correcting signal, such as a parity signal, is added to each block. When an error is detected in one information signal in one block at the receiving end, all bits of the signal containing an error are set to zero and the remaining correctly received signal and the error correcting signal in the block are added by modulo 2 addition to provide a correct signal to replace the one containing an error. When more than 2 signals in one block contain errors due to, for example, burst errors which typically endure for longer than the transmission time of one word, the resulting error in two or more contiguous words in a block cannot be corrected.

In an error correcting system applied in the field of computers as disclosed in U.S. Pat. No. 3,697,948, an encoding and decoding system provides information as to which bytes are in error and extends the error correcting capability of the system to two bytes of data containing error. The transmitted message comprises k bytes of data ($D_0, D_1, D_2, \cdots D_{k-1}$), each having b bits, plus two check bytes $C_1$ and $C_2$, each having small b bits. The message is encoded by computing the check bytes according to the following relationship:

$$C_1 = I D_0 \oplus I D_1 + \cdots \oplus I D_{k-1}$$

$$C_2 = I D_0 \oplus T K_1 \oplus T^2 D_2 \oplus \cdots \oplus T^{k-1} D_{k-1}$$

Wherein I is an identity matrix and $T, T^2, \cdots T^{k-1}$ are distinct non-zero elements of a Galois Field ($2^b$), wherein the indicated multiplication and addition are Galois Field defined operations, and wherein b is an integer $<1$ and k is an integer $2>k>2^b$. $C_1$ is a simple parity code and $C_2$ is a b-adjacent code.

A decoder is effective to recover the data without error when not more than two of the bytes in the message are in error no matter how many bits in the two bytes are in error. Pointers are required to indicate the two bytes containing errors. In the absence of pointers or in the presence of a single false pointer, the decoder is effective to recover the data without error when not more than a single byte is in error no matter how many bits may be in error in the single byte. When more than 3 bytes in k bytes simultaneously contain errors due to burst error or the like during the data transmission, such errors cannot be corrected.

OBJECTS AND SUMMARY OF THE INVENTION

Accordingly, an object of the present invention is to provide a PCM signal transmitting system which converts analog audio signals into digital signals and transmits them as PCM signals.

It is another object of the present invention to provide a PCM signal transmitting system which uses a VTR as an apparatus for recording and reproducing the PCM signals.

According to the present invention, since the data is interleaved before transmission, a burst error resulting from a signal dropout appearing in a transmission system such as, for example, in a VTR, is dispersed over time, and thus, when de-interleaved on reception, produces no more than a random error in the de-interleaved signal. Such random error can usually be corrected using error correcting codes appended to information words in the signal. By providing error correction using a parity and a b-adjacent code, errors within two words in a de-interleaved block can be corrected. A PCM signal transmission system according to the present invention thus provides improved error correction capability with less chance of failing to detect an error.

According to the present invention, a PCM signal transmission system may be used in a signal recording and reproducing apparatus in which, for example, a 2-channel stereo signal is pulse code modulated and the resulting PCM signal is recorded and reproduced by a VTR.

According to this invention, a block of information words is defined having bits in rows and columns. A first parity signal consisting of vertical parity bits is formed from a plurality of rows of the PCM signal, and a second parity signal is formed by supplying a predetermined bit of the PCM signal to a b-adjacent coder. An adjacent code or b-adjacent code has a symbol on GF ($2^b$) (which is a Galois Field having $2^b$ elements) and is a general name for codes which can correct errors in bit groups. Examples of b-adjacent codes include the Hamming code and the Reed-Solomon code and so on. In the following example, a matrix code multiplied by a generating matrix T is used as a code symbol of a b-adjacent signal. A generating matrix T corresponding to the d'th order of a generating polynominal G (x) is expressed as follows:

$$G(x) = \sum_{i=0}^{d} g_i x^i, \quad g_0 = g_d = 1$$

$$T = \begin{bmatrix} 000 \cdots & g_0 \\ & g_1 \\ I_{d-1} & g_2 \\ & \vdots \\ & g_{d-1} \end{bmatrix}$$

of (d×d). In this case, $I_{d-1}$ is a unit matrix of $(d-1)\times(d-1)$.

If the information words containing errors can be identified, errors in a second word in a block can be corrected using the b-adjacent signal. To detect the position of errors, an error detecting code produces a pointer which is added after interleaving to the transmitted signal which contains PCM interleaved from a plurality of time-separated information words with their first and second error correcting codes.

According to the invention, errors in two information words can be completely corrected. If an error is not identified by a pointer, an error in one word can be corrected in a block. Since the PCM signal is reconstructed by time de-interleaving word by word from each of a plurality of time interleaved blocks to form one block, when the correction of errors is impossible, words in error can be replaced by an average value of correct words before and after the uncorrectable word. Further, since the word in which an error exists is indicated by a pointer, a simple encoder and decoder can be used.

The above, and other objects, features and advantages of the present invention will become apparent from the following description taken in conjunction with the accompanying drawings.

DESCRIPTION OF THE PREFERRED EMBODIMENT

Figure 1:
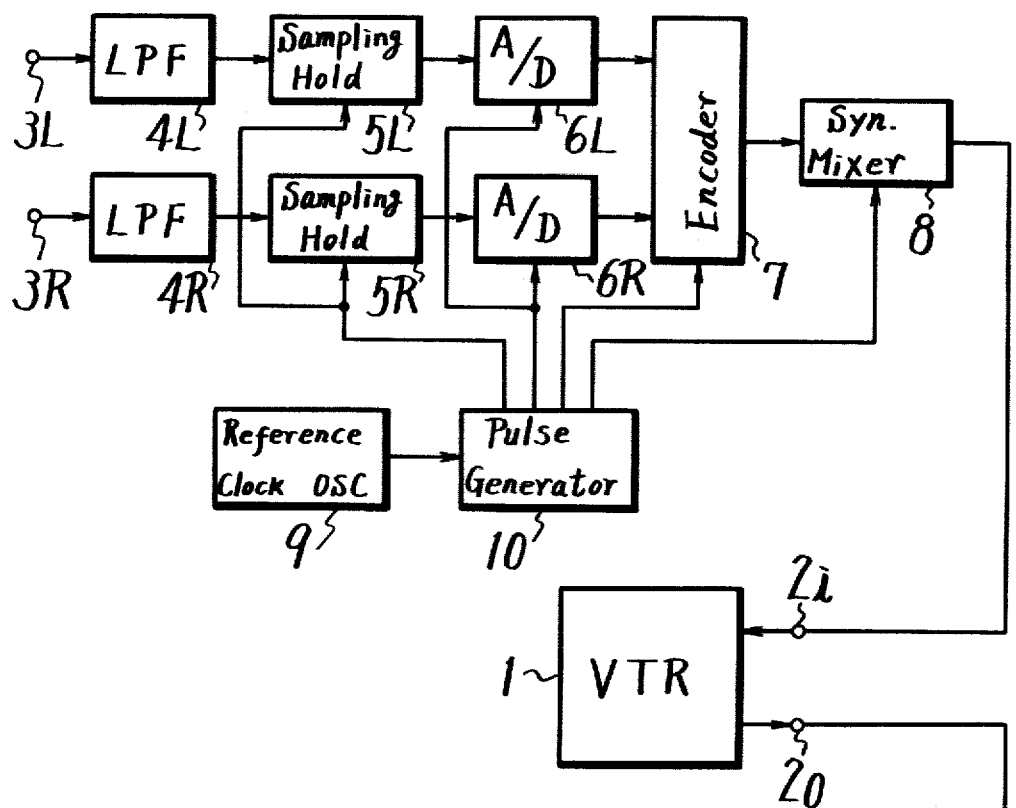
FIG. 1 is a signal recording and reproducing apparatus which includes a PCM signal transmitting system according to an embodiment of the present invention.
Figure 1:
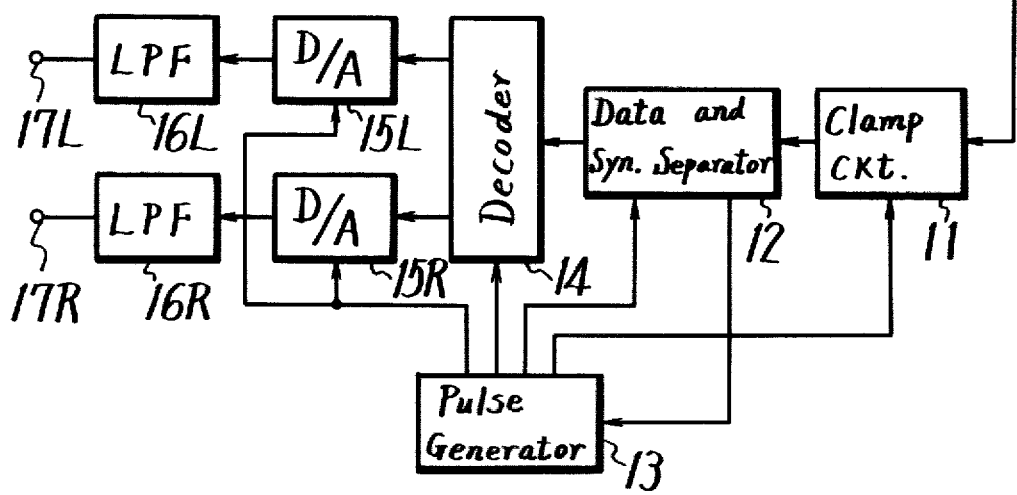

Referring now to FIG. 1, a PCM signal processing adapter circuit is shown connected to a video input terminal $2i$ and a video output terminal $2o$ of a helical scan VTR 1 (video tape recorder). VTR 1 is normally used for recording and reproducing a video signal. With the PCM signal processing adapter circuit of the present invention, VTR 1 is capable of recording and reproducing a PCM-encoded audio signal of extremely high fidelity.

Input terminals 3L and 3R receive left and right channel analog stereo audio signals, respectively, which are supplied through low pass filters 4L and 4R to sample and hold circuits 5L and 5R. Sampled outputs of sample and hold circuits 5L and 5R are supplied to A-D converters 6L and 6R to be PCM encoded into multi-bit digital information words, of which there is one word for each sample. The encoded outputs of A-D converters 6L and 6R are supplied to an encoder 7. Encoder 7 adds parity signals, compresses the time base and time interleaves the resulting PCM signal as will be described. The output of encoder 7 is a serial signal which is applied to a synchronizing signal mixer circuit 8. A reference clock oscillator 9 supplies reference clock signals to a pulse generator circuit 10 which produces sampling pulses for control of sample and hold circuits 5L and 5R, clock pulses for control of A-D conversion in A-D converters 6L and 6R, control signals for encoder 7, and composite synchronizing signals for addition to the serial PCM signal encoder 7 in synchronizing signal mixer circuit 8. The output from synchronizing signal mixer circuit 8 is fed to video input terminal $2i$ of VTR 1 for recording in a conventional matter on a video tape (not shown).

The PCM signal reproduced by VTR 1 is delivered through video output terminal $2o$ and a clamp circuit 11 to a data and synchronizing signal separator circuit 12. The separated composite synchronizing signal is supplied to a pulse generator circuit 13, and the separated PCM signal is supplied to a decoder 14. Decoder 14 performs time base expansion, error detection and error correction on the PCM signal and applies the resulting digital signals to D-A converters 15L and 15R. Analog outputs of D-A converters 15L and 15R are applied through low pass filters 16L and 16R to output terminals 17L and 17R, respectively. Pulse generator circuit 13 provides clamp pulses for clamp circuit 11, control signals for data and synchronizing signal separator circuit 12, control signals for decoder 14 and clock pulses for D-A converters 15L and 15R in response to the composite synchronizing signal applied thereto from data and synchronizing signal separating circuit 12.

Figure 2:
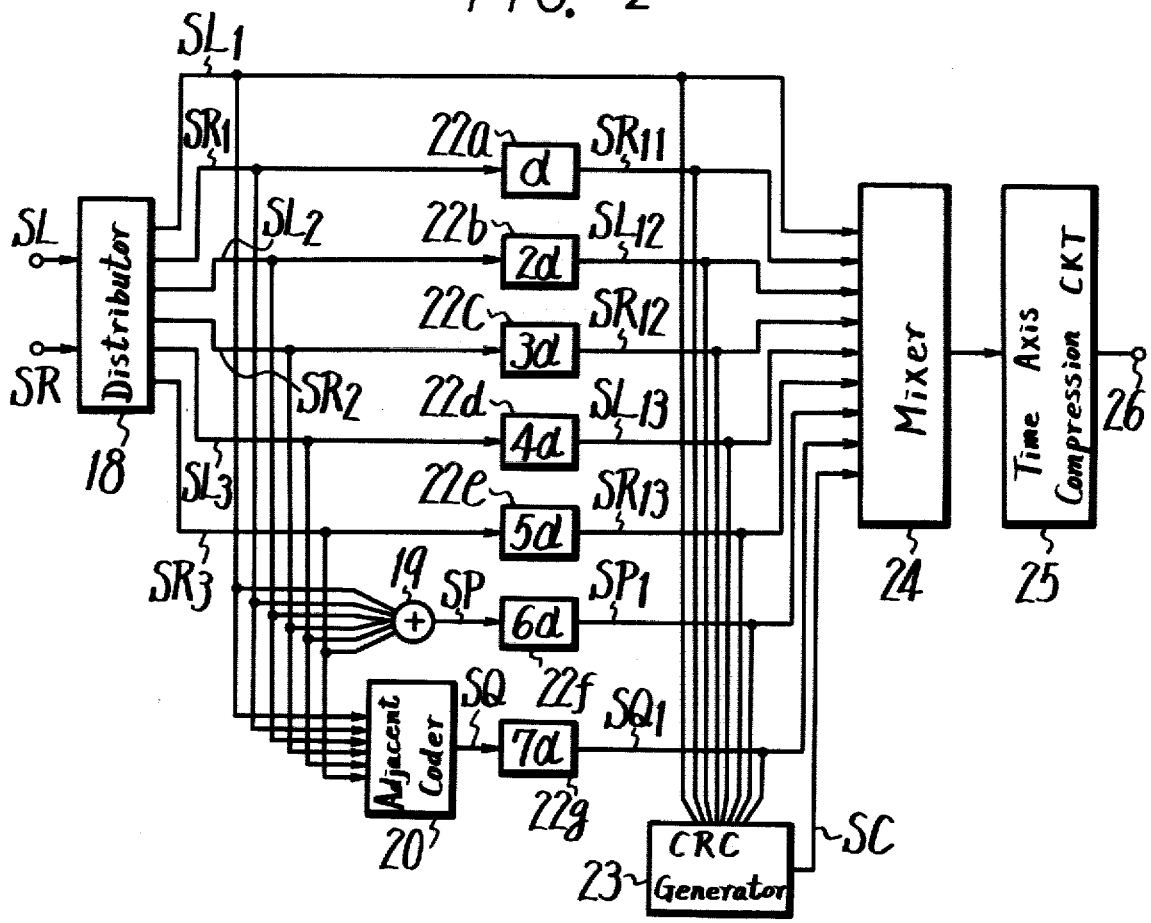
FIG. 2 is a block diagram showing an encoder suitable for use in the apparatus of FIG. 1.

Referring to FIG. 2, encoder 7 of FIG. 1 is shown in detail. PCM signal sequences SL and SR (series coded) from A-D converters 6L and 6R are supplied to a distributor circuit 18 wherein the left and right channels are each divided into 3 channels to result in a total of 6 channels. For example, the PCM signal sequence or series SL which continues as $L_{-2}, L_{-1}, L_0, L_1, L_2, L_3,$ - - - and the PCM signal series SR which continues as $R_{-2}, R_{-1}, R_0, R_1, R_2, R_3,$ - - - are distributed into a first channel PCM signal series $SL_1$ which contains every third channel from the left source ($L_{-2}, L_1, L_4,$ - - -), a second channel PCM signal series $SR_1$ also containing every third channel from the right source ($R_{-2}, R_1, R_4,$ - - -), a third channel PCM signal series $SL_2$ ($L_{-1}, L_2, L_5,$ - - -), a fourth channel PCM signal series $SR_2$ ($R_{-1}, R_2, R_5,$ - - -), a fifth channel PCM signal series $SL_3$ ($L_0, L_3, L_6,$ - - -), and a sixth channel PCM signal series $SR_3$ ($R_0, R_3, R_6,$ - - -).

One word in the PCM signal series in each channel is supplied to a modulo 2 adder 19 to produce a first parity signal series SP and, word by word, to an adjacent channel coder 20 to produce a second parity signal series SQ.

The PCM signal series $SR_1, SL_2, SR_2, SL_3$ and $SR_3$ and first and second parity signal series SP and SQ are respectively supplied to delay circuits $22a, 22b, 22c, 22d, 22e, 22f$ and $22g$. Delay circuits $22a$ to $22g$ time interleave the six PCM signal series and the first and second parity signal series by providing delays of d, 2d, 3d, 4d, 5d, 6d and 7d (word time), respectively, when a unit delay amount is taken as d (word time). Delay circuits $22a$ to $22g$ may be any suitable circuits, such as, shift registers or RAM (random access memory). Delayed PCM signal series $SR_{11}, SL_{12}, SR_{12}, SL_{13}$ and $SR_{13}$, and the delayed parity signal series $SP_1$ and $SQ_1$ from delay circuits $22a$ to $22g$, respectively, as well as undelayed signal series $SL_1$, are applied to inputs of a mixer or parallel-two-serial converter 24 and a CRC (cyclic redundancy code) code generator 23. CRC code generator 23 produces a CRC code SC corresponding to the eight words at its inputs to thereby provide a pointer signal series which is applied to an input of mixer 24. The CRC code is an error detecting code using a cyclic code, and CRC generator 23 is a modulo 2 subtractor which employs a generating polynomial.

Figure 3A:
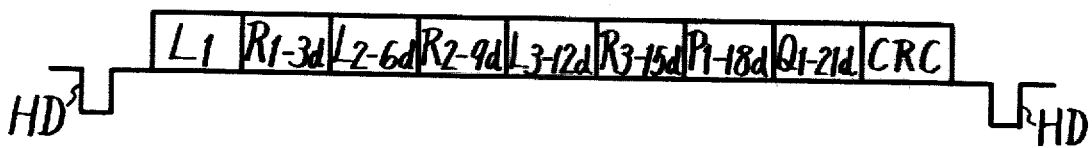
FIG. 3A is a graph showing the time relationship of signals to which reference will be made in describing the time interleaving of data.

Mixer 24 converts its parallel inputs to a serial signal transmitted one bit at a time to a time base compression circuit 25. Time base compression circuit 25 compresses the time base of the serial signal at its input in order to provide a serial signal series having data absent periods properly timed to permit the addition of synchronizing signals. As shown in FIG. 3A, a horizontal period between horizontal synchronizing signals HD contains six PCM data words, two parity words, and one CRC or pointer signal word. The six-word PCM signal, two-word parity signal and one-word CRC code are supplied to synchronizing signal mixer circuit 8 (FIG. 1) wherein horizontal synchronizing pulses HD are added in the data absent periods.

Figure 3B:
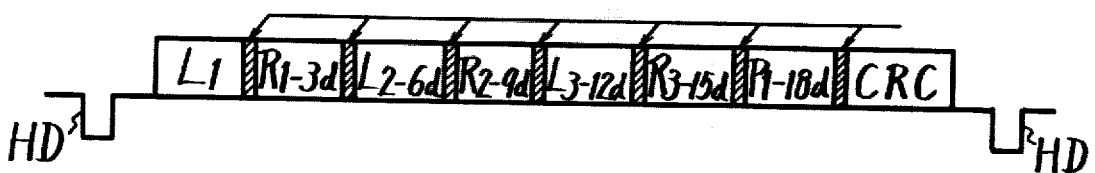
FIG. 3B is a graph showing an alternative method of appending a parity code to a set of data signals.

FIG. 3B shows an alternate format for including the adjacent channel PCM $Q_{1-21d}$ in the serial signal. In the example of FIG. 3A each word may have 14 bits. In FIG. 3B, each word contains 16 bits. The 14-bit adjacent-channel code $Q_{1-21d}$ is split into seven 2-bit portions (shown cross hatched) which are inserted as the final 2-bits of each of the six data words and the parity word, as shown in FIG. 3B. In this case, the signal comprises six PCM signal words, one parity signal word and one CRC code word. Thus, the signal sequence of FIG. 3B includes seven 16-bit words and one 14-bit word rather than the nine 14-bit words of FIG. 3A.

The following description provides the basis for understanding error correction by encoder 7 and decoder 14 of the present invention. As an example, let it be assumed as follows. When six words $L_1$, $R_1$, $L_2$, $R_2$, $L_3$ and $R_3$ are received from distributor circuit 18, first and second parity signals $P_1$ and $Q_1$ are generated by modulo 2 adder 19 and adjacent channel coder 20, as follows:

$$P_1 = L_1 \oplus R_1 \oplus L_2 \oplus L_3 \oplus R_3$$

$$Q_1 = T^6 L_1 \oplus T^5 R_1 \oplus T^4 L_2 \oplus T^3 R_2 \oplus T^2 L_3 \oplus T R_3$$

A generating matrix T is a certain d'th order generating polynominal G(x) which prevents the same value from appearing in T, $T^2$, $T^3$, $T^4$, $T^5$ and $T^6$ of the above expression. Where second parity signal $Q_1$ is required to provide error correction for six words, $d \geq 3$ must be satisfied. When $d=3$, if the generating polynomial G(x) is a reduced polynomial on GF(2) (Galois Field), (T, $T^2$, $T^3$, $T^4$, $T^5$, $T^6$, $T^7$) do not contain the same value. This reduced polynomial is $G(x) = 1 + x + x^3$, so that T may be expressed as follows:

$$T = \begin{bmatrix} 0 & 0 & 1 \\ 1 & 0 & 1 \\ 0 & 1 & 0 \end{bmatrix}$$

Since (T, $T^2$, $T^3$, $T^4$, $T^5$) are all necessary for the present case, it is not always necessary that the generating polynomial G(x) be a reduced polynomial. Further, when the second parity signal is provided by multiplication of one word of the respective PCM signal, which is expressed as a vector, by the generating matrix, the bit length of one word should be taken into consideration. As an example, when one word is 14 bits, the following (14×14) generating matrix T is used.

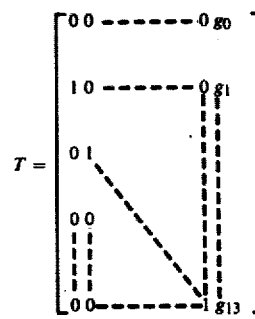

where $G(x) = g_0 + g_1 x + g_2 x^2 + \cdots g_{13} x^{13} + g_{14} x^{14}$ is the 14th generating matrix and ($g_0 = g_{14} = 1$) as in the above case. Also, when one word is 14 bits, a second parity signal of 3 bits may be provided from the result obtained by dividing 14 bits by 3 bits and the generating (3×3) matrix. In this case, since 14 bits cannot be evenly divided by 3, a dummy bit of either "0" or "1" is added at the end to make one word containing 15 bits. The dummy bit need not be transmitted.

As described above, when one word has a certain number of bits and a plurality of channels form one block, the realizability of the encoder and the decoder (the construction of its control circuit, memory capacitor, cost, etc.) depends upon the form of the generating matrix which is selected. The first parity signal series SP can be produced in parallel by adder 19 as in the encoder shown in FIG. 2, or in series by a shift register of one word length and one exclusive OR gate. The syndrome, or error correcting pattern, can be formed by the first parity signal series SP in a similar manner. Thus, simple circuits are sufficient for producing the first parity signal series SP. Formation of the second parity signal series SQ in adjacent channel coder 20 and error correction thereby in decoder 14 (FIG. 1) are a greater problem. The memory for time base compression (or expansion) and interleave (or de-interleave) depends on the method chosen for producing this signal. Optimization is described for a system in which a block is formed of six 14-bit words of PCM data and first and second 14-bit parity signals.

The following table shows the ways in which a system which permits correction of errors in two channels and one word can be divided into separate blocks.

| Number of Division (n) | Number of Divided Bits (m) | Magnitude of T | Number of Bits Q |
|---|---|---|---|
| 1 | 14 | 14 × 14 (=196) | 14 |
| 2 | 7 + 7 | 7 × 7 (=49) | 14 |
| 3 | 5 + 5 + 5 | 5 × 5 (=25) | 15 |
| 4 | 4 + 4 + 4 + 4 | 4 × 4 (=16) | 16 |
| 5 | 3 + 3 + 3 + 3 + 3 | 3 × 3 (=9) | 15 |

Second parity signal Q can be produced using a shift register which has the same number of bits as the number of divided bits (m) in the divided word. Thus, a shift register having as few as three bits can be used (n equals 5). However, in order to multiply the generating matrix T by the data, the data are read out sequentially from a RAM to the shift register (which is necessary for time base compression or interleave). Thus, when the I/O of the RAM is taken into consideration, the divided bit number (m) should be more than 4 and the number of divisions (n) should be either 1 or a multiply of 2 so as to easily control the RAM. When n is 1, 2 and 4, the above condition is satisfied. Further, n=2 is most preferred since the number of bits in the shift register is small and a useless factor of a dummy bit is not required. From the table, a value n=2 corresponds to a number of divided bits m=7.

Next the decoder is discussed. The syndrome $S_1$ produced during decoding by the first parity signal is expressed by the following expression when the error pattern of the word in an i'th channel is taken as $x_i$ and the error pattern of the word in a j'th channel as $x_j$.

$$S_1 = x_i \oplus x_j$$

The syndrome $S_2$ produced by the second parity signal is expressed as follows:

$$S_2 = T^{7-i}x_1 \oplus T^{7-j}x_j$$

When i and j are detected by the CRC code and identified by pointers, the error patterns for both $x_i$ and $x_j$ can be obtained from the following simultaneous equations.

$$\begin{cases} x_j = (I \oplus T^{i-j})^{-1}(S_1 \oplus T^{i-7}S_2) \\ x_i = S_1 \oplus x_j \end{cases}$$

The error can be corrected by adding the error patterns $x_i$ and $x_j$ to the corresponding error words. If the above process is carried out under the assumption that the words containing errors disappear (all are set to "0"), correct words can be generated and substituted for the two words containing.

The circuit which provides the syndrome $S_2$ is similar to the circuit which provides the parity signal Q, so that (n=2) and (m=7) are also suitable for it.

The operational equation for obtaining $x_j$, $T^{i-7}$ is also similar to the foregoing. The following describes the manner in which the factor $(I \oplus T^{i-j})^{-1}$ of the operational equation is generated. Calculation of the factor using a shift register is very complicated. Therefore, it is better that a look-up table corresponding to every possible (i−j) be memorized in a ROM (read only memory). Since (i−j) contains only five possibilities, a ROM of (m×m×5) bits is sufficient for a divided bit number m. To calculate the matrix, it is convenient to read an output of every row of the (m×m) matrix. Accordingly, with a view to also facilitating control of the ROM, the ROM may be one of the following:

```
n = 1 m = 14  16 × 16 × 8 = 2048(bits)
n = 2 m = 7    8 ×  8 × 8 =  512 (bits)
n = 3 m = 5    8 ×  8 × 8 =  512 (bits)
n = 4 m = 4    4 ×  4 × 8 =  128 (bits)
n = 5 m = 3    4 ×  4 × 8 =  128 (bits)
```

Where the calculation of $(I \oplus T^{i-j})^{-1}$ is carried out by the output of the ROM, if the calculation is performed bit by bit, the number of outputs required from the ROM is m. If m bits are calculated at a time, (m×m) outputs are necessary. Almost all commercially available ROMs provide 4 or 8 outputs, so that, if m is equal to or less than the number of outputs of the ROM (4 or 8), the calculation can be performed bit by bit. If m is larger than the number of outputs of the ROM, a buffer register is needed to store the outputs of the ROM to permit similar calculation bit by bit. However, in this case, the cost of the buffer register is added. In view of the foregoing, it is preferred that m be not more than 7 bits.

The values of $(I \oplus T^{i-j})^{-1}$ and the data $(S_1 \oplus T^{i-7}S_2)$ may be memorized in a look-up table in a ROM and then processed at once. If 3 bits are allocated to (i−j), an input address of 3 bits is required, the total input is (m+3) bits and the output is m bits. Even when (m=14), a ROM of such great capacity is required that it is almost impossible to realize. Thus, m should be not more than 7 bits.

As may be apparent from the foregoing, when one word contains 14 bits, the 14 bits should be divided into two sets of 7 bits. Thus, the formation of the second parity signal SQ, and error correction using the second parity signal and the memory control thereof become easy, and hence the encoder and decoder are simplified.

When the number of divided bits is 7, one example of the generating matrix T can be expressed as follows:

$$T = \begin{bmatrix} 0 & 0 & 0 & 0 & 0 & 0 & 1 \\ 1 & 0 & 0 & 0 & 0 & 0 & 1 \\ 0 & 1 & 0 & 0 & 0 & 0 & 0 \\ 0 & 0 & 1 & 0 & 0 & 0 & 0 \\ 0 & 0 & 0 & 1 & 0 & 0 & 0 \\ 0 & 0 & 0 & 0 & 1 & 0 & 0 \\ 0 & 0 & 0 & 0 & 0 & 1 & 0 \end{bmatrix}$$

where $G(x) = 1 + x + x^7$ is taken as the generating polynomial.

By way of example, when the second parity signal $Q_1$ is provided for error correction of six words ($L_1$, $R_1$, $L_2$, $R_2$, $L_3$, $R_3$), the following expressions are obtained:

$$Q_{1a} = T^6 L_{1a} \oplus T^5 R_{1a} \oplus T^4 L_{2a} \oplus T^3 R_{2a} \oplus T^2 L_{3a} \oplus T R_{3a}$$

$$Q_{1b} = T^6 L_{1b} \oplus T^5 R_{1b} \oplus T^4 L_{2b} \oplus T^3 R_{2b} \oplus T^2 L_{3b} \oplus T R_{3b}$$

where $L_{1a}$ is the seven most significant bits and $L_{1b}$ is the seven least significant bits of word $L_1$, and $R_{1a}$, $R_{1b}$, $L_{2a}$, $L_{2b}$, $R_{2a}$, $R_{2b}$, $L_{3a}$, $L_{3b}$, $R_{3a}$ and $R_{3b}$ are also seven bit sub-words as above. The first parity signal $P_1$ is provided with word units similar to the above.

Figure 4:
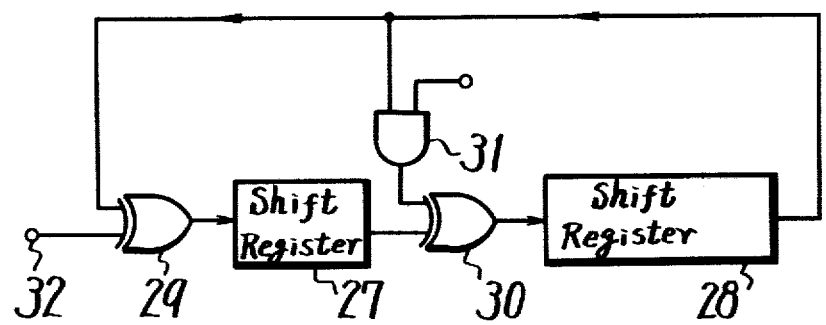
FIG. 4 is a block diagram of an adjacent coder suitable for use in the encoder of FIG. 2.

Turning to FIG. 4, an adjacent channel encoder 20a (part of adjacent channel encoder 20) for providing a 7-bit parity signal $Q_{1a}$ is shown. Encoder 20a contains a 1-bit shift register 27, a 6-bit shift register 28, exclusive OR gates 29 and 30, and an AND gate 31. The PCM signal is applied to an input terminal 32 beginning with the most significant bit in the order of $L_{1a}$, $R_{1a}$, $L_{2a}$, - - - $R_{3a}$. Shift registers 27 and 28 are first cleared and the output of AND gate 31 is held at "0" by a gate signal applied to its input. PCM signal $L_{1a}$ is shifted into shift registers 27 and 28. Then, the gate signal is set to "1" to shift the stored signal 1-bit. The content of shift registers 27 and 28 is changed to $(TL_{1a})$. The gate signal is then set to "0" and $R_{1a}$ is applied to exclusive OR gate 39 to store $(TL_{1a} \oplus R_{1a})$. The gate signal is set to "1" to shift the stored signal 1-bit and thus to store $(T^2 L_{1a} \oplus T R_{1a})$. The above operation is repeated on the remaining PCM signals to provide the parity signal $Q_{1a}$.

Figure 5:
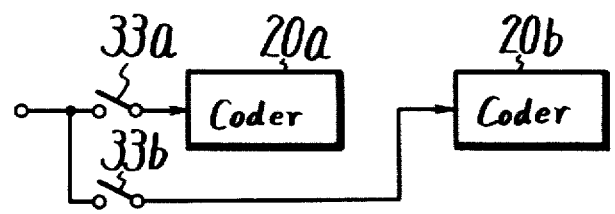
FIG. 5 is a block diagram of another adjacent coder suitable for use in the encoder of FIG. 2.

Since encoder 20a in FIG. 4 includes only 7-bits for each channel, it cannot be controlled in common with adder 19 from which 14-bits are derived to provide the parity signal $P_1$. Therefore, the circuit of FIG. 5 may be used which contains coders 20a and 20b each similar to that shown in FIG. 4. The seven most significant bits are supplied through a switch 33a to encoder 20a, and the seven least significant bits are supplied through a switch 33b to encoder 20b.

Figure 6:
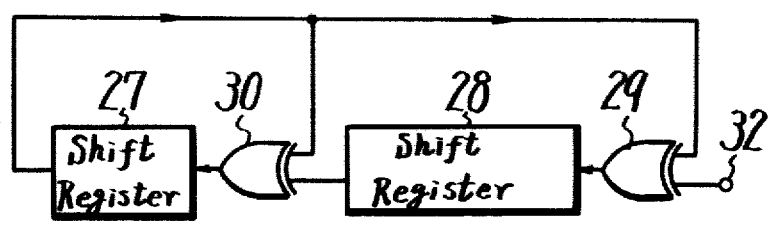
FIG. 6 is a block diagram of a decoder suitable for use in the embodiment of FIG. 1.

A $T^{-1}$ multiplier circuit, which is necessary for decoder 14 (FIG. 1), is shown in FIG. 6. Shift registers 27 and 28 are shifted in the reverse direction compared to shift registers 27 and 28 in FIG. 4. In the multiplier circuit of FIG. 6, when the PCM signal is supplied to an input terminal 32, the least significant bit is supplied first.

Figure 7:
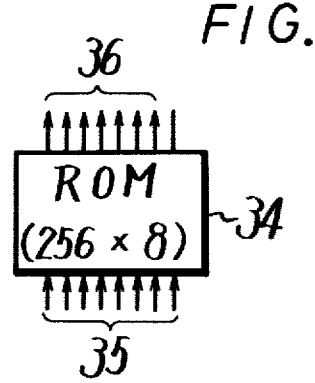
FIG. 7 is a block diagram of a read only memory used as a multiplier.

Multiplication of the 7-bit PCM signal by T or $T^{-1}$ may be carried out by a ROM 34 of $(256 \times 8)$ bits, as shown in FIG. 7. Eight input data lines 35 apply the 7-bit PCM signal of 7-bits and a 1-bit signal which selects T or $T^{-1}$. The 7-bit result is derived at output data lines 36.

Figure 8:
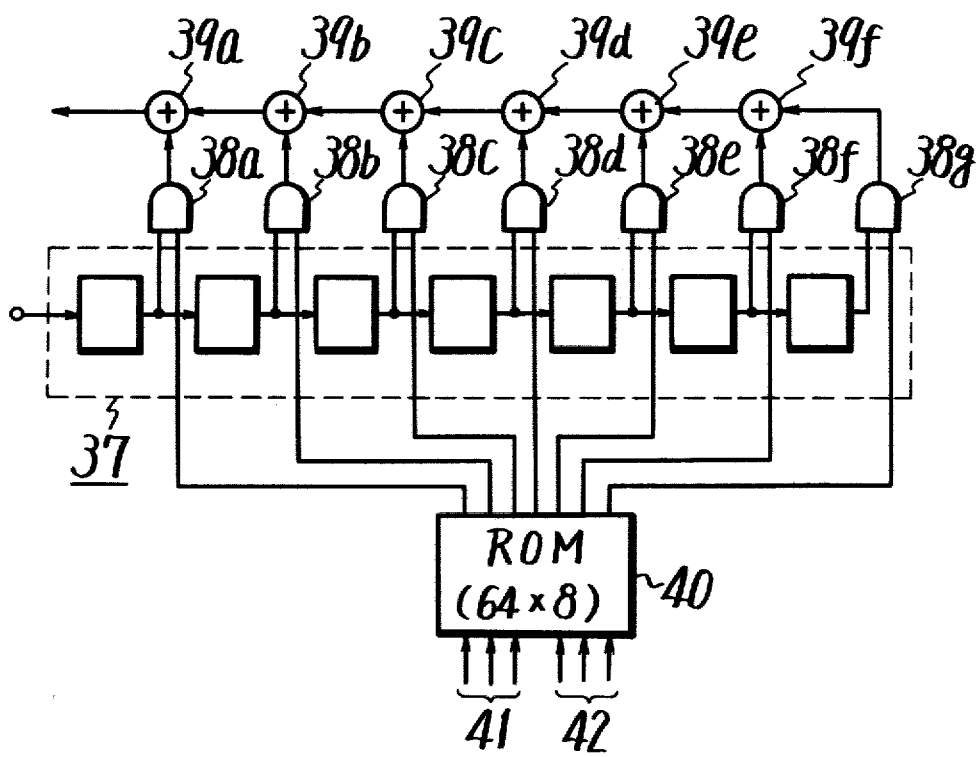
FIG. 8 is a block diagram showing another multiplier and to which reference will be made in describing the operation of the apparatus in FIG. 1.

A multiplier circuit for the multiplication of $(I \oplus T^{i-j})^{-1}$ and the operation result (data) of $(S_1 \oplus T^{i-7}S_2)$, is shown in FIG. 8. The data is stored in a 7-bit data register 37. The stored data and the output from a ROM 40 corresponding to one row of $(I \oplus T^{i-j})^{-1}$ are supplied to AND gates 38a to 38g, respectively. The outputs from AND gates 38a to 38g are supplied to modulo 2 adders 39a to 39f, whereby one bit of the operation result is obtained. ROM 40 contains $(64 \times 8)$ bits and receives a 3-bit row select signal at input data lines 41, which sequentially appoints the first to seventh rows, and a 3-bit select signal at input data lines 42 which appoint (i−j).

Instead of using the multiplier circuit of FIG. 8 which produces the operation result one bit at a time, it may be possible to use a ROM which simultaneously provides all seven bits. By supplying a 3-bit select signal, which appoints seven bits of data (i−j), the seven bits of a predetermined operation result is read out in one step. A ROM of $(1024 \times 8)$ bits is necessary to accomplish this.

Figure 9:
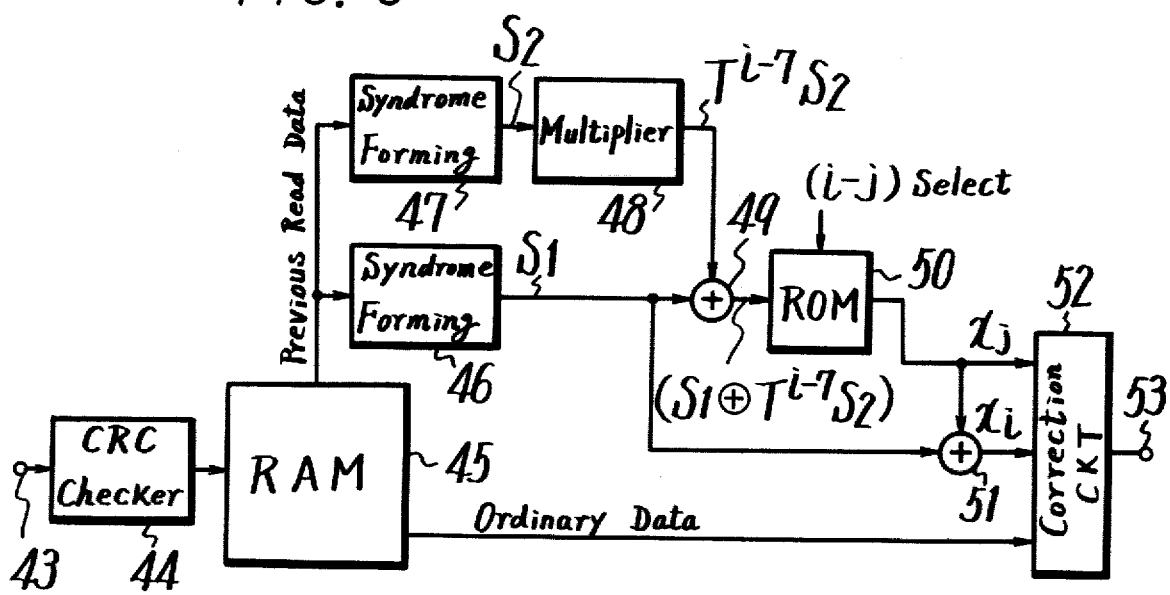
FIG. 9 is a block diagram of another embodiment of a decoder suitable for use in the apparatus of FIG. 1.

An embodiment of decoder 14 (FIG. 1) is schematically shown in FIG. 9. Decoder 14 performs series processing in contrast to encoder 7 (FIG. 2) which performs parallel processing. The PCM signal from data and synchronizing signal separator 12 (FIG. 1) is applied through an input terminal 43 to a CRC checker 44. CRC checker 44 detects whether an error exists in the time interleave block of data in each horizontal period. When an error is detected in a horizontal period, a 1-bit error marker or flag is added to each word in the horizontal period. The PCM signal, with or without an error marker, is applied to a time base expansion and de-interleave circuit 45 (which is a RAM). A previous read data signal from RAM 45 is supplied to syndrome forming circuits 46 and 47 and is operated on therein before the ordinary data is supplied to a correction circuit 52. Syndrome forming circuit 46 provides the syndrome $S_1$ and syndrome forming circuit 47 provides the syndrome $S_2$, respectively. The syndrome $S_2$ is supplied to a multiplier 48 by which $T^{i-7}S_2$ is provided. This $T^{i-7}S_2$ is fed to an adder 49 which is also supplied with the syndrome $S_1$ from syndrome forming circuit 46, so that adder 49 provides $(S_1 \oplus T^{i-7}S_2)$ which is then fed to a ROM 50 serving as an operational circuit. ROM 50 produces an error pattern $x_j$ which is supplied simultaneously to an adder 51 which is also supplied with syndrome $S_1$. Thus, the adder 51 also produces an error pattern $x_i$.

The ordinary data from time base expansion and deinterleave circuit 45 and error patterns $x_i$, $x_j$ are supplied to correction circuit 52 which then develops a PCM signal, in which errors are corrected, and delivers the corrected signal to output terminal 53. A compensation circuit (not shown) may be connected to output terminal 53. When errors exist in three or more channels and the errors can be corrected, the compensation circuit may substitute, for the uncorrectable PCM signal, the digital mean value of the correct PCM signals which are positioned, in point of time, before and after the uncorrectable PCM signal.

The six channels of PCM signals, time de-interleaved by applying appropriate delays thereto to produce two PCM signals containing the reproduced left and right channels, are fed to B-A converters 15L and 15R (FIG. 1), respectively, for reconversion into analog signals.

As may be understood from the foregoing, according to the present invention, errors in up to two channels in the six channels of PCM signal can be completely corrected. If the CRC code fails to detect an error in a single one of the six PCM channels, an error can still be detected by syndromes $S_1$ and $S_2$. Therefore, a PCM signal transmission system having high error correction capability is achievable by the present invention. Further, in this invention, six channels of PCM signal and two channels of parity signal are transmitted time interleaved so that a burst error in the transmission path is converted into random bit errors (which most often produces an error within no more than two channels of each time interleaved block) and hence the correction capability is improved.

Further, an error detection marker added to the signal permits detection and identification of channels in which an error exists. This improves detection and simplifies the construction of a decoder.

Further, in this invention, one block is formed of a six-word PCM signal and a two-word parity signal with a one-word CRC error detection code added thereto, so that modification can be made in the apparatus for error correction while the code construction is kept the same. That is, variations in the code construction permit error correction of a single error using a single error correction code when a error is detected by the error detection code. Correction of errors in up to two channels may be formed using the error detection code along with the first and second parity signals.

Further, the number m of the divided bits is determined in consideration of the number of bits in a word and of the number of channels, so that the encoder can be made at low cost.

Other detection codes may be used instead of the CRC code. For example, a parity code may be used.

Having described specific preferred embodiments of the invention with reference to the accompanying drawings, is to be understood that the invention is not limited to those precise embodiments, and that various changes and modifications may be effected therein by one skilled in the art without departing from the scope or spirit of the invention as defined in the appended claims.

We claim:

1. A method of processing sequentially transferred digital information words, said method comprising the steps of:

forming a block of a plurality of said information words;

forming a parity error correcting word corresponding to said block and adding said parity error correcting word to said block;

forming a b-adjacent error correcting word corresponding to said block and adding said b-adjacent error correcting word to said block;

time-interleaving each of said information words and said primary and b-adjacent error correcting words in said block into time-interleaved blocks distributed over a predetermined time;

adding an error detecting code to at least one of said time-interleaved blocks; and transmitting said at least one time-interleaved block and said error detecting code associated therewith.

2. A method according to claim 1; further comprising the steps of:

receiving said time-interleaved block having said information words, said error correcting words, and said error detecting code;

detecting an occurrence of errors in said time-interleaved block by said error detecting code and adding a marker to each of the words in said time-interleaved block in response to detected errors;

de-interleaving each word in said time-interleaved block including information words, said error correcting words and said marker;

generating error signals indicative of the bits in error in each of the words in error indicated by words in said block having markers supplied in response to said error detecting code; and correcting up to two of said words in error utilizing said error correcting words.

3. An apparatus for processing digital information words comprising:

means for forming a block of a plurality of said information words;

means for forming and adding a parity error correcting word and a b-adjacent code error correcting word to said block;

means for time-interleaving each of said information words and said error correcting words in said block into time-interleaved blocks distributed over a predetermined time;

means for adding an error detecting code to at least one of said time-interleaved blocks; and means for transmitting said at least one time-interleaved block and said error detecting code associated therewith.

4. An apparatus according to claim 3; further comprising:

means for receiving said time-interleaved block having said information words, said error correcting words, and said error detecting code;

means for detecting an occurrence of errors in said time-interleaved block by said error detecting code and for adding a marker to each of the words in said time-interleaved block in response to detected errors;

means for de-interleaving each word in said time-interleaved block including information words and said error correcting words into said block;

means for generating error signals indicative of the bits in error in each of the words in error in said block having markers provided by said error detecting code; and means for correcting up to two of said words in error in said block by utilizing said error correcting words.

5. An attachment for permitting a video tape recorder to record and reproduce at least one high quality audio signal on a video tape, comprising:

means for converting said audio signal to a plurality of multi-bit digital words, each of said digital words containing a representation of a characteristic of said audio signal at a discrete point in time;

means for defining a block consisting of a fixed plurality of said digital words;

means for producing a first error correcting word for said block and for adding said first error correcting word to said block;

means for producing a second error correcting word for said block and for adding said second error correcting word to said block;

said first and second error correcting words having a characteristic which permits correction of errors in first and second digital words in said block if said first and second digital words which contain errors are identified and which permits correction of errors in a single digital word in said block if identification of digital words containing errors is not possible;

means for time-interleaving each of said digital words and said first and second error correcting words from said block each into different time interleaved blocks;

means for producing an error detecting word for each time-interleaved block and for adding each said error detecting word to its respective time interleaved block; and means for transmitting said time interleaved block including said error detecting code as a serial signal including at least horizontal synchronizing pulses to a video tape recorder for recording therein.

6. An attachment according to claim 5; further comprising:

means for receiving a serial signal reproduced by the video tape recorder including said time interleaved blocks having said error detecting words and said synchronizing pulses;

means responsive to said error detecting word for detecting an error in at least one of said digital words in said time-interleaved block and for making all of said digital words in said time-interleaved block with a marker to indicate that an error is detected;

time de-interleaving said digital words and said first and second error correcting words into their original blocks whereby no more than one word from a time interleaved block is time de-interleaved into any one time de-interleaved block;

means for sensing digital words in said time de-interleaved blocks which have markers as a result of their being previously contained in a time interleaved block containing an error;

means for correcting errors in at least two digital words containing markers in said time de-interleaved block; and means for reconverting said digital words into a reproduced audio signal.

* * * * *